United States Patent
Wei et al.

(10) Patent No.: US 8,464,277 B2
(45) Date of Patent: Jun. 11, 2013

(54) METHOD AND SYSTEM FOR INVOLVING AND OPERATING A REMOTE APPLICATION WITHIN A DIFFERENT SYSTEM/APPLICATION IN MEDICAL IMAGING

(75) Inventors: Guo-Qing Wei, Plainsboro, NJ (US); Feng Ma, Pennington, NJ (US); James N. Parsells, Manville, NJ (US); Li Fan, Belle Mead, NJ (US); Jian-Zhong Qian, Princeton Junction, NJ (US); Cheng-Chung Liang, West Windsor, NJ (US); Xiaolan Zeng, Princeton, NJ (US)

(73) Assignee: EDDA Technology, Inc., Princeton Junction, NJ (US)

( * ) Notice: Subject to any disclaimer, the term of this patent is extended or adjusted under 35 U.S.C. 154(b) by 736 days.

(21) Appl. No.: 12/509,924

(22) Filed: Jul. 27, 2009

(65) Prior Publication Data
US 2010/0043013 A1  Feb. 18, 2010

Related U.S. Application Data (63) Continuation-in-part of application No. 11/785,413, filed on Apr. 17, 2007.

(60) Provisional application No. 61/083,819, filed on Jul. 25, 2008.

(51) Int. Cl.
*G06F 9/44* (2006.01)

(52) U.S. Cl.
USPC ............................................. 719/315; 705/3

(58) Field of Classification Search
USPC ........................................................ 719/315
See application file for complete search history.

(56) References Cited

U.S. PATENT DOCUMENTS

| | | |
|---|---|---|
| 5,978,590 A | 11/1999 | Imai et al. |
| 2005/0031181 A1 | 2/2005 | Bi et al. |
| 2005/0060195 A1* | 3/2005 | Bessette et al. .................. 705/2 |

(Continued)

FOREIGN PATENT DOCUMENTS

WO  WO 2006/026650 A2  3/2006

OTHER PUBLICATIONS

International Search Report and Written Opinion of the International Searching Authority issued in International Patent Application No. PCT/US2009/051852, mailed Oct. 23, 2009.

(Continued)

*Primary Examiner* — Andy Ho
*Assistant Examiner* — Abdou Seye
(74) *Attorney, Agent, or Firm* — Dentons US LLP (57) ABSTRACT

A method and system for process/data sharing. A trigger response unit, corresponding to a first application residing in a first system, is deployed in a second system. The trigger response unit detects information embedded in trigger data, representing the first application with associated data, when the trigger data is activated in a second system. Based on the information detected, a launching request is generated and sent to the first system to launch an instance of the first application in the first system with respect to the associated data. The second system receives, via a remote access protocol, a dynamic graphical representation of the first application launched in the first system based on the launching request. The associated data is manipulated in the second system using the first application launched in the first system via the dynamic graphical representation of the first application displayed in the second system.

21 Claims, 9 Drawing Sheets

U.S. PATENT DOCUMENTS

2005/0111711 A1* 5/2005 Deaven et al. ............... 382/128
2005/0207658 A1   9/2005 Schofield
2006/0139367 A1* 6/2006 Tseng ........................... 345/589
2008/0144897 A1* 6/2008 Lal et al. ....................... 382/128

OTHER PUBLICATIONS

International Search Report and Written Opinion of the International Searching Authority, issued in Corresponding International Patent Application No. PCT/US2007/009344, dated on Dec. 19, 2007.

Matt Neuburg, "Apple Script; The Definitive Guide, 2nd Edition", Jan. 1, 2006, retrieved from the Internet: URL: retrieved on Dec. 7, 2007.

* cited by examiner

METHOD AND SYSTEM FOR INVOLVING AND OPERATING A REMOTE APPLICATION WITHIN A DIFFERENT SYSTEM/APPLICATION IN MEDICAL IMAGING

RELATED APPLICATION

This application is a Continuation-In-Part of U.S. patent application Ser. No. 11/785,413, filed on Apr. 17, 2007, and claiming priority over U.S. Provisional Application No. 61/083,819 filed Jul. 25, 2008, the contents of which are incorporated herein in their entirety.

BACKGROUND

1. Technical Field

The present teaching relates generally to methods and system for process and data sharing. Specifically, the present teaching relates to methods and system for accessing an application residing in a foreign system environment.

2. Discussion of Technical Background

In medical imaging, patient data are often processed by one or more dedicated clinical Data Processing and Analysis Application (DPAA) systems. Due to the fact that DPAAs may reside in a system environment different from where the patient data are reviewed such dedicated clinical DPAAs may be accessed from a Data Manipulation System (DMS) residing in an environment where the patient data are reviewed, which is different from that of the DPAAs. For example, a Computer-Aided Detection (CAD) system (a DPAA) that identifies lung lesions in CT data and a Computer-Aided Diagnosis (CADx) system (another DPAA) that analyzes hepatic lesions and the liver in CT data may reside in a system that is different from a Picture Archiving and Communication System (PACS) environment which is a routine reading environment where a physician stores and review the CT data of a patient. As such, in order to use the CAD system and the CADx system to analyze the CT data of the patient, the CAD system and the CADx system have to be accessed from the PACS environment, which is different from the environment where the CT data are read. In this case, a physician needs to invoke the CAD/CADx applications in his/her working environment to perform needed analysis on the same patient data and to use the CAD/CADx system's interactive tools to review the CAD/CADx analysis results.

Currently there are mainly three types of solutions to allow a physician to utilize an application residing in a different system environment. One type is to transport the result from the processing generated by the DPAAs in a static format such as Digital Imaging and Communication in Medicine (DICOM) that is recognizable both by DPAA and the DMS system where the physician operates. In this manner, the DPAA runs on its own system based on the same data and then packs the result in a format that can be used in the other environment. With this solution, only the processing results are displayed in the DMS environment and such results are static. The DPAA's interactive data manipulation tools can not be accessed in the DMS environment where a physician is working. As such, it is not possible for the physician to interactively utilize the DPAA's in the DMS environment to perform data manipulation and analysis as needed.

The second type of solution is to integrate the DPAAs, such as a CAD system, with the DMS, such as a PACS, through some mutually defined APIs. With this solution, implementing the API-based integration requires code-level engineering effort, which is not only time consuming but also cost prohibitive. For example, considering the complexity of CAD systems and PACS systems on today's market, the effort to achieve such API-based integration can be very costly. This kind of integration is especially difficult if one considers integration with systems already installed in a clinical environment. Other dedicated clinical applications, such as 3D visualization, have similar restrictions in their accessibility within another independent system.

BRIEF DESCRIPTION OF THE DRAWINGS

The inventions claimed and/or described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

DETAILED DESCRIPTION

The present teaching relates to method and systems enabling a user to access and operate an application residing on a foreign system environment. Specifically, the present teaching discloses a method and system which enables an efficient approach to facilitate a user to access an application residing in a different system environment.

Figure 1A:
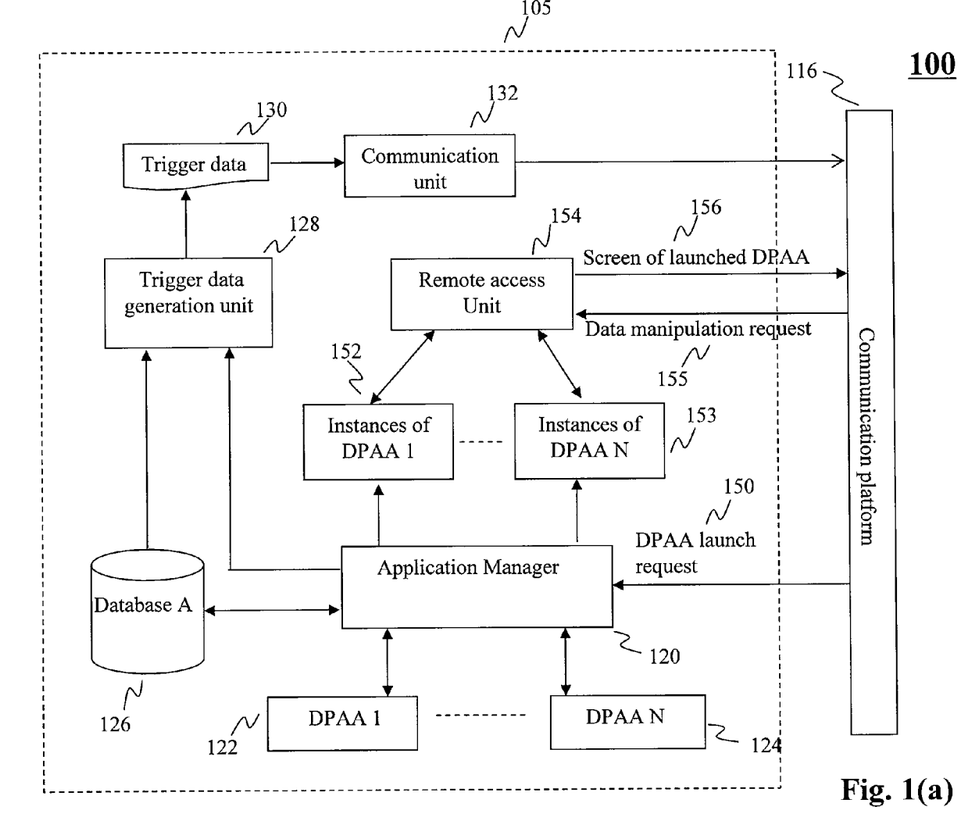
FIGS. 1(a) and 1(b) depict an exemplary construct of a system configured for accessing an application residing on one system from a different system, according to an embodiment of the present teaching.
Figure 1B:
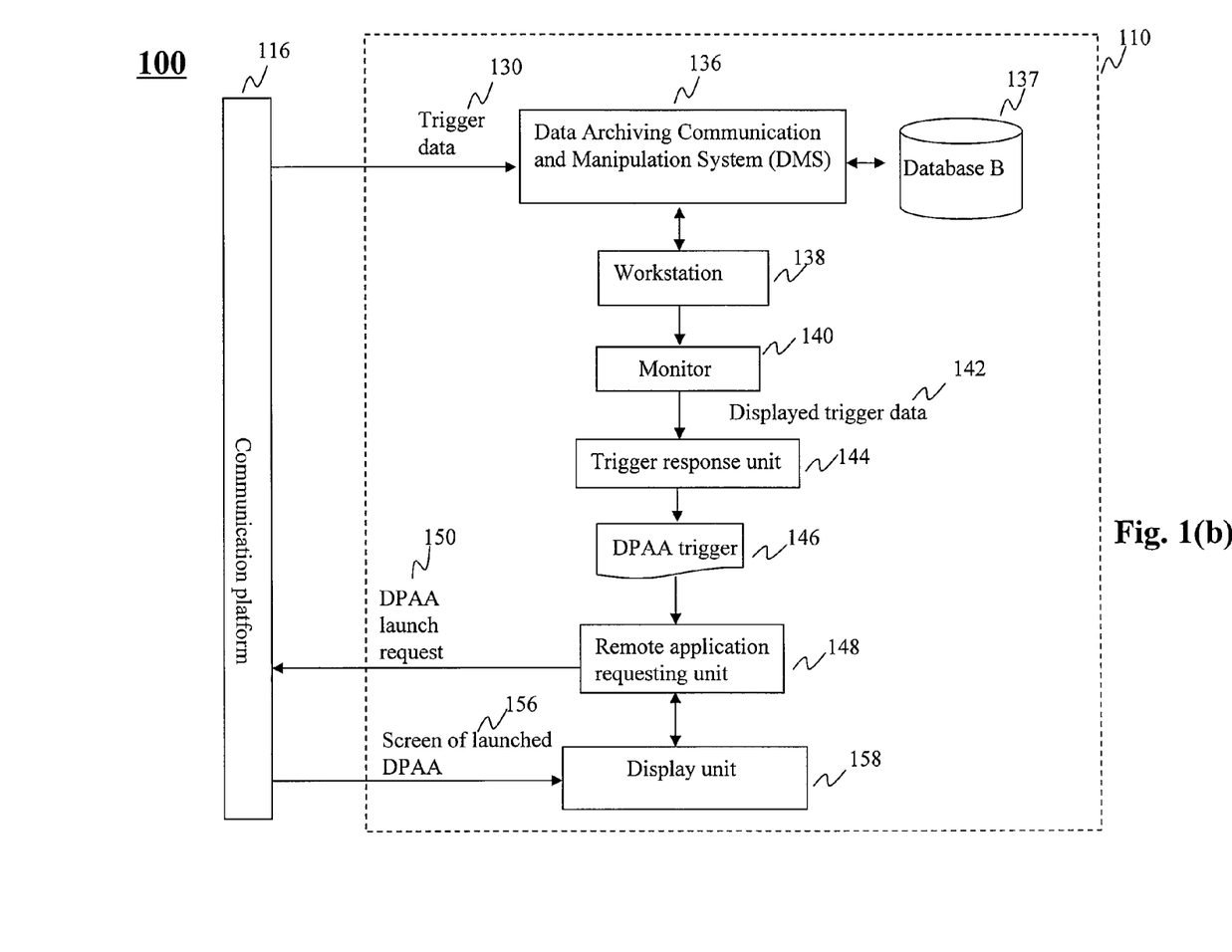

FIGS. 1(a) and 1(b), depict an exemplary construct 100 of a system facilitating a user to access an application residing in a foreign system environment, according to an embodiment of the current teaching. The system 100 comprises a first system environment 105, where one or more Data Processing and Analysis Applications (DPAAs) and data reside or are hosted, and a second system environment 110, where DPAAs can be accessed or activated to process data. The two systems 105 and 110 are connected via a communication platform 116. In some embodiments, the two system environments 105 and 110 may operate in different environments of a same physical computing device. In some embodiments, system environments 105 and 110 may reside in two physically different computing devices.

The first system 105 comprises one or more DPAA 1 122, . . . and DPAA N 124 and their corresponding instances 152, . . . 153, an application manager 120 responsible for various administrative tasks related to facilitate access different DPAAs, a database A 126, a trigger data generation unit 128 that generates trigger data 130, a communication unit 132, and a remote access unit 154, facilitating remote access of an instance of a DPAA from a foreign system (e.g., system 110). In some embodiments, the first system 105 may be distributed, i.e., residing on more than one physical computer systems. For example, DPAA 1 122, . . . DPAA N 124 may reside on different systems but managed by a centralized application manager 120. In some embodiments, the DPAAs and the application manager 120 may also be physically hosted on different computers. In some situations, database A 126 may also be centralized or distributed and may be controlled by a database server (not shown).

Instances of DPAA 1 122 . . . DPAA N 124 may be created, e.g., upon a request, to process patient data retrieved from a data storage, e.g., database A 126. Database A 126 may store both original patient data and processed results. It may host data of different types. For example, such stored data may include, but not limited to, patient record, reports on patient's tests, medical images taken from the patient, such as X-ray, CT, MRI, Tomosynthesis, and results of various data processing applied to certain patient data. Medical images may be initially acquired by some image acquisition device(s) (not shown) and then stored in database A 126 for future retrieval. Such stored information may be indexed or organized based on different criteria in accordance with application needs so that they can be flexibly retrieved upon a request. The information stored in database A 126 may be accessed by the system 105 or remotely from the system 110, as discussed herein.

Each of the DPAAs may be identified based on some identification information. Identification information associated with each DPAA can be used to uniquely identify, both from the system 105 and system 110, the processing tools desired. A particular DPAA may be accessed based on identification information associated with the DPAA. For instance, a liver nodule detection application and a lung cancer detection application may be identified and, hence, activated using their corresponding unique identification information. Similarly, data associated with each patient may also be stored or indexed based on some identification information so that they can be retrieved accordingly. Such identification information for patient data may be used to uniquely retrieve all information related to that particular patient. For example, a user operating on system 110 may access patient data stored in system 105 based on the patient identification information.

Such identification information, either for a DPAA or for patient data, may be sent to a different system (e.g., the system 110 in FIG. 1(b)) so that a user operating in that foreign system can use such received identification information to indicate what the user desires to access from system 105. For instance, the identification information representing a specific DPAA may be sent to the foreign system 110 so that a user working in this foreign environment may use to invoke this DPAA residing in system 105. As another example, if identification information associated with a patient is sent to system 110, when a user working in system 110 desires to view or analyze medical data associated with this patient, such identification information may be used to retrieve the proper patient data residing in system 105 for such tasks.

The identification information may be sent to system 110 in an encoded form. Such encoded identification information may be embedded with other information and together as trigger data 130, which can be generated, as illustrated, by the trigger data generation unit 128. The trigger data may be used to represent the identity of a DPAA or identity of a patient and the representation can be in any form. For example, the trigger data 130 may be in the form of a number corresponding to an identification number. In co-pending patent application Ser. No. 11/785,413 on "Methods for enabling an application within another independent system/application via data encapsulation in medical imaging" by J. Z. Qian, F. Ma, G. Q. Wei, C. C. Liang, L. Fan, X. Zeng; and 60/954,738 on "Information encoding for enabling an application within a different system/application in medical imaging" by G. Q. Wei, J. Z. Qian, F. Ma, X. Zeng, C. C. Liang, L. Fan, H. Chen, various forms of trigger data and generation thereof are disclosed.

The trigger data 130, once generated, may be sent to the foreign or second system 110 by the communication unit 132 via the communication platform 116. The communication platform 116 may be designed to be responsible for all communications between system 105 and system 110. Depending on the specific system configuration in a particular application, the communication platform 116 may be in different form. For instance, when the system 105 and system 110 reside in different computer systems, the communication platform 116 can be a local area network (LAN), a wide area network (WAN), the Internet, a virtual network, a proprietary network, a wireless network, or a public switched telephone system (PSTN) network. When system 105 and system 110 reside in the same computing equipment, each may correspond to a specific hard drive location or a specific network port number. In this case, the communication platform 116 may correspond to a communication protocol that enables different parts of a computing system to communicate with each other.

Through the communication platform 116, the trigger data 130 are sent to the foreign system 110. In accordance with the present teaching, the presence of the trigger data 130 in a foreign system enables the initiation of a process of remotely accessing a DPAA hosted on system 105 from the foreign environment 110. The process is initiated after detecting the presence of trigger data 130 in the foreign system 110. As discussed herein, the remote access unit 154 in system 105 is responsible for, after the remote access process is initiated, enabling the foreign system 110 to actually access an instance of a DPAA residing in the system 105. Details related to this remote access process will be discussed below with reference to FIGS. 1(b), 2, 4-6.

FIG. 1(b) depicts an exemplary system architecture of the foreign system 110 in which a user is capable of accessing a DPAA hosted on system 105, according to an exemplary embodiment of the present teaching. The foreign (or second) system 110 comprises a Data Manipulation System (DMS) 136, a plurality of work stations 138, a trigger response unit 144, a remote application requesting unit 148, and a display unit 158 which displays a screen of a remotely launched DPAA in foreign system 110. In addition, the foreign system 110 may also includes a monitor 140 through which the trigger response unit 144 may detect the presence of the trigger data 130 displayed thereon and initiate a remote DPAA access procedure.

The DMS 136 may be any system or application that performs certain computations or functions on data. Such computation includes, but not limited to, data storage/archiving, data communication, data processing and analysis, and data visualization. An example of such a system is a Picture Archiving and Communicating System (PACS). In the illustrated embodiments, DMS 136 may receive and store trigger data 130 from the system 105. The foreign system 110 optionally may include a database B 137 for storing the received trigger data 130.

The trigger response unit 124 may be designed to correspond with the first system 105. Specifically, the trigger response unit 124 may be designed to correspond with the DPAA applications residing in system 105. However, the trigger response unit 124 is deployed and operates within the foreign or second system 110. In accordance with the present teaching, once being deployed on the second system 110, the trigger response unit 124 monitors what is happening in the second system 110. For instance, the trigger response unit 124 may be designed to continually monitor, in the foreign system 110, whether a particular piece of trigger data is displayed on a display screen, e.g., monitor 140. When a piece of the trigger data 130 are displayed on the monitor 140, the trigger response unit 124 detects the specific trigger pattern of the displayed trigger data and extracts or decodes the identity information embedded in the displayed trigger data. As discussed herein, the identity information embedded with trigger data may include the identification information for both the DPAA to be accessed and the patient data. Such decoded identification information for an underlying DPAA (146) is then sent to the remote application requesting unit 148 so that it can be used to identify the corresponding DPAA represented by the decoded identification information.

Figure 2:
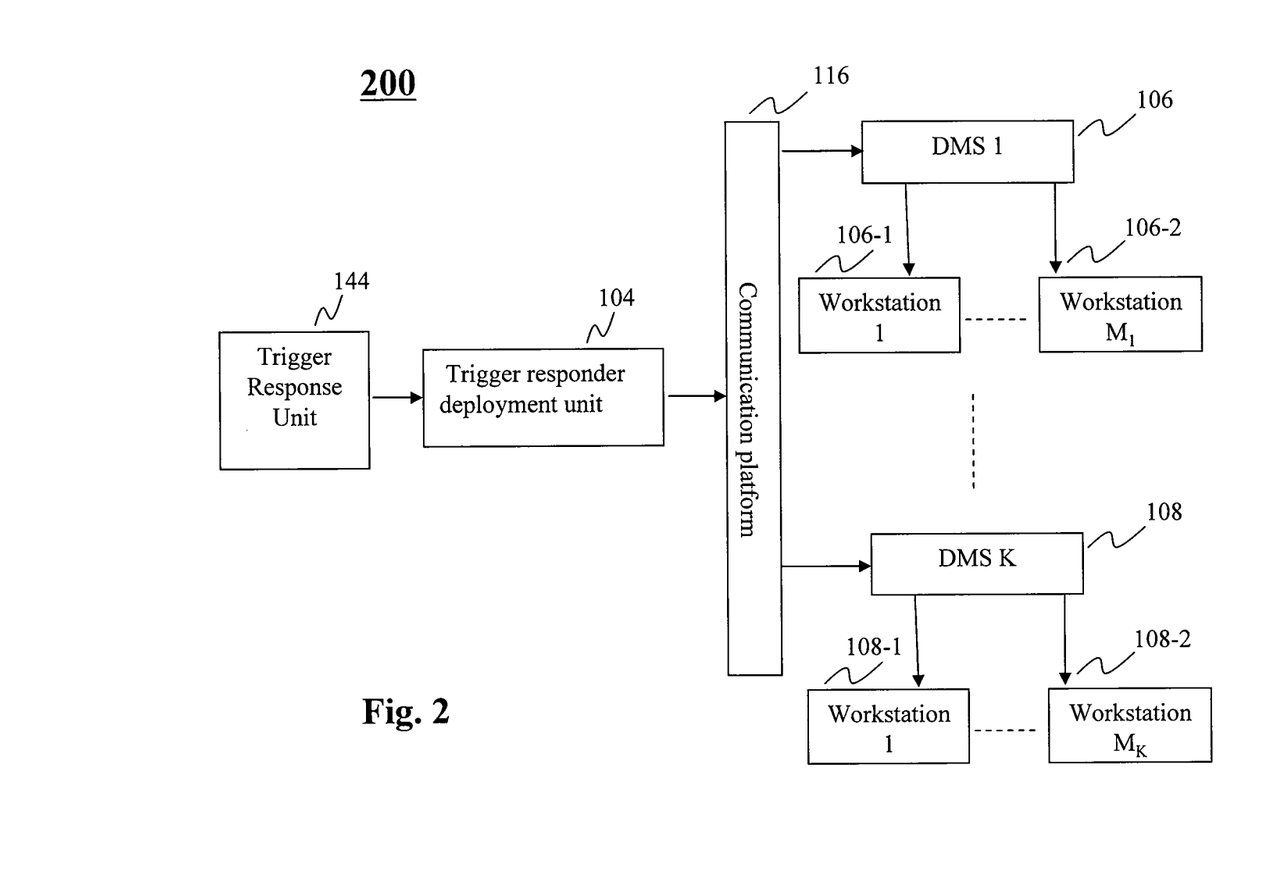
FIG. 2 depicts an exemplary configuration of a system for deploying a trigger response unit in a different system, according to an embodiment of the present teaching.

In some embodiments, the trigger response unit 124 is deployed and up-running in the second system 110 prior to, e.g., the DMS 136 is activated to display the trigger data 130 received from the first application system 105. The deployment of the trigger response unit 124 may be done using any method known in the art such as direct installation, download, or remote deployment. For that purpose, the system 105 may optionally includes a trigger response unit deployment unit 104, as exemplified in FIG. 2, where the trigger response unit 144 is sent to the second system 110 for deployment by the trigger response unit deployment unit 104. In some embodiments, as shown in FIG. 2, the foreign system 110 may include a plurality of DMSs, i.e., DMS 1 106, . . . , DMS K 108. Each of the DMSs may be connected to one or more workstations, e.g., DMS 1 106 is connected to workstation 106-1, . . . , workstation $M_1$ 106-2, . . . , DMS K 108 is connected to workstation 108-1, . . . , workstation $M_K$ 108-2. With a configuration as shown in FIG. 2, the trigger response unit 144 may be deployed in either a selected group of or all of the workstations connected to the system 110.

Upon receiving the identification information related to a DPAA or DPAA trigger 146, extracted from the trigger data 130, the remote application requesting unit 148 may then send to the application manager in the first system 105 a DPAA launch request 150 via the communication platform 116. Such a DPAA launch request may incorporate the identification information for both the DPAA and the patient data.

Referring back to FIG. 1(*a*), within system 105 where the requested DPAA and patient data reside, upon receiving the DPAA launch request 150, the application manager 120 then initiates the process of launching an instance of the requested DPAA in system 105. According to the present teaching, instead of launching an instance of the entire DPAA requested in foreign system 110, the screens of the instance of the DPAA launched in system 105 is transmitted to the foreign system 105. A user in the foreign system 110 is allowed to remotely access DPAAs and patient data through remotely manipulating such screens in a dynamic manner.

As the DPAA launch request 150 is embedded with identification information for both DPAA desired and specific patient data, the instance of the DPAA being launched in system 105 is initiated specifically with respect to the requested patient data. For example, the screens of the launched DPAA include appropriate information for a remote user to manipulate. For instance, the instance may include different types of medical data associated with the patient requested so that any selection of tools made available from the requested DPAA will be directed to the requested patient data. To achieve this, based on the received patient ID, the application manager 120 access the patient data stored in database A 126 and incorporate such patient data with the requested DPAA(s). Then the application manager 120 creates instance(s) (152, . . . , 153) of requested DPAA(s) (122, . . . , 124) by incorporating the patient data retrieved from the database A 126 in the instance created.

Therefore, each instance of a DPAA may be specific to particular patient data. Thus, for different DPAA launch requests, the DPAA instances created may differ, even if the underlying DPAA corresponds to the same application. For instance, if a DPAA corresponds to an application that detects liver nodules from CT scans, each instance of this application is created with a particular patient's data such as CT scans and/or liver nodule detection result. When screens of such an instance are sent to the foreign system 110, a user in the foreign system 110 can accordingly review the CT scan and detection result associated with the particular patient of interest. In addition, any further processing to, e.g., refine the detection, may also be appropriately directed to the same patient data. The further manipulation of the patient data via a remotely launched DPAA is discussed in detail below with reference to FIGS. 4-6. When a different request for the same DPAA but with a different patient ID, the instance created to satisfy the second request is a different DPAA application instance.

Each DPAA instance created based on a DPAA launch request may be presented in foreign system 110 based on its screens (or user interfaces). In accordance with the present teaching, to satisfy the DPAA launch request, the system 105 launches an instance of the requested DPAA with appropriate patient data and then sends the screen(s) of the launched DPAA instance to the foreign system 110. Such screen(s) with patient data and/or processed results loaded therewith, is sent to the requesting workstation in the foreign system 110 through the remote access unit 154. In some exemplary embodiments, the remote access unit 154 may employ data compression techniques to minimize the bandwidth required to transmit the information.

Upon receiving a screen 156 of the launched DPAA at the display unit 158 in the foreign system 110, the screen may then be displayed on a display device, e.g., the monitor 140 of a requesting workstation. From that point on, via the remote access unit 154, a user, local to the requesting workstation in the foreign system 110, may remotely interact with the launched DPAA instance (in system 105) via the screen 156 to perform different DPAA's operations on the patient data loaded with the DPAA instance. For example, when a user in the system 110 interacts with the screen 156, the user may request a further manipulation on the patient data associated with the launched DPAA.

The user may click a button displayed in the screen 156 and the button may represent a data manipulation function. When such interaction occurs in the foreign system 110, a data manipulation request may be accordingly generated based on the interaction and such a request may be sent, from the foreign system 110 back to system 105 where the underlying DPAA is actually launched. Such a data manipulation request may be sent to the remote access unit 154 in system 105 (see FIG. 1). Upon receiving such a data manipulation request, the remote access unit 154 may forward the request to the launched instance of the underlying DPAA (e.g., to instance of DPAA 1 152). Upon receiving the request, the launched instance of the DPAA may then proceed to process the associated patient data in accordance with the request.

Such remote data manipulation may yield results that need to be reflected and displayed to the user in the foreign system 110 who initiates the request. In this case, the launched instance of DPAA may generate an updated screen which incorporates the data manipulation results. For example, when a physician (user) in the foreign system requests to update the detected liver nodule boundary using his/her hand drawn boundary points, such a request together with the coordinates of the hand drawn boundary of the liver nodule may be sent from the foreign system 110 to system 105. Such coordinates may then be used by a liver nodule detection DPAA to update the screen where a CT scan of the liver is shown with the hand drawn boundary points superimposed on the scan image. Such an updated screen incorporating the hand drawn liver nodule boundary is forwarded to the remote access unit 154, which then send to the foreign system in the form of a screen, as shown in FIG. 1.

The remote access unit 154 may employ a remote access protocol that can be any of the remote access protocols available in the market place, including, but not limited to, Remote frame buffer, Microsoft remote desktop protocol (RDP), X display protocol, Hypertext Transfer Protocol (HTTP), or any remote display technology. The display unit 158 may be any of the mechanisms capable of interfacing with a remote access protocol deployed in accordance with the present teaching. This includes, but not limited to, one of the following: remote display viewer (e.g., VNC viewer), Microsoft remote desktop, X display server, or any remote display software.

In another exemplary embodiment, more than one DPAA launch request 150 may be simultaneously sent from the foreign system 110 to the application manager 120 in system 105. For example, more than one workstation connected with a single DMS may issue DPAA launch requests. In some embodiments, such multiple DPAA launch requests may also be from workstations connected to different DMS's. In some embodiments, when multiple requests are issued, an instance of each requested DPAA may be created individually even when the underlying DPAA and patient ID are the same. In this way, screen(s) for each instance can be displayed on a different requesting workstation, which allows users on different workstations to proceed with their further processing independently.

In operation, through the remote access protocol, multiple users, when working with different workstations in one or more foreign systems, may simultaneously access DPAAs hosted in a different system environment and perform patient study based on their individualized needs. In this manner, DPAAs distributed across different systems can be effectively invoked and utilized to process different patient data based on dynamic needs, in accordance with the present teaching. In addition, because only screens are transmitted across different systems (rather than the entire DPAA system or actual patient data), the access to the DPAA hosted in a foreign environment is light weight and puts minimum requirement on network bandwidth and speed.

Figure 3:
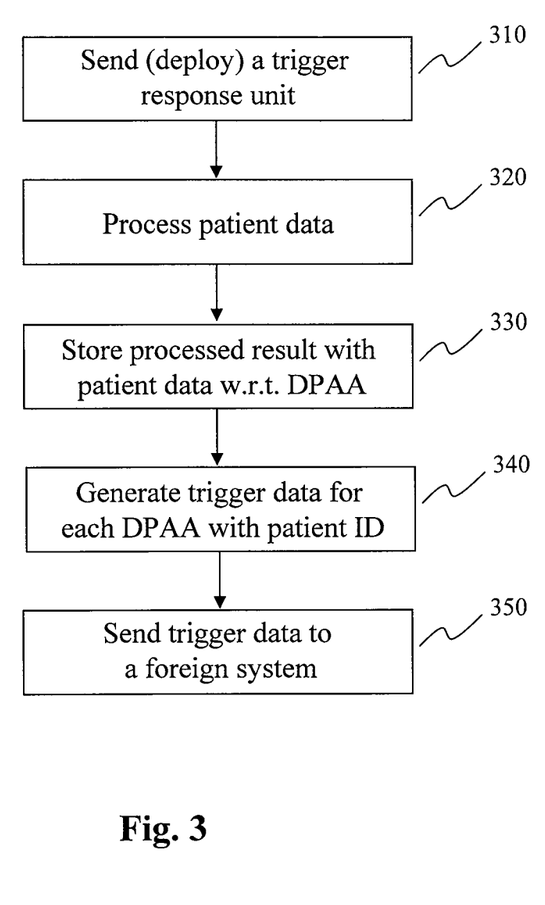
FIG. 3 is a flowchart of an exemplary partial process of a system hosting DPAAs, according to one embodiment of the present teaching.

FIG. 3 is a flowchart of an exemplary partial process of system 105, according to one embodiment of the present teaching. At step 310, the trigger response unit 144 may be sent or deployed in the foreign system 110 environment. This can be done remotely from the system environment 105 (as shown in FIG. 3) or through installation locally in the system 110 (not shown). As discussed herein, DPAAs and patient data are hosted in system environment 105. In this environment 105, different DPAAs process patient data, at 320, and such processed results are saved, at 330, in a database local to the system 105. Such saved results may be indexed with respect to different DPAAs. For instance, the processing result of specific patient data produced by DPAA 1 122 may be indexed differently from the processing result on the same patient data but produced by DPAA N 124. That is, patient data with processing results produced by different DPAAs are individually indexed so that they can be individually retrieved.

Such stored patient data and processing results from each DPAA may be used to generate, at 340, trigger data which embeds both DPAA's ID and the ID for the underlying patient data/processing results produced by the DPAA. Such generated trigger data may then be sent, at 350, to a foreign system to enable remote access of the underlying DPAA with particular patient data loaded.

Figure 4:
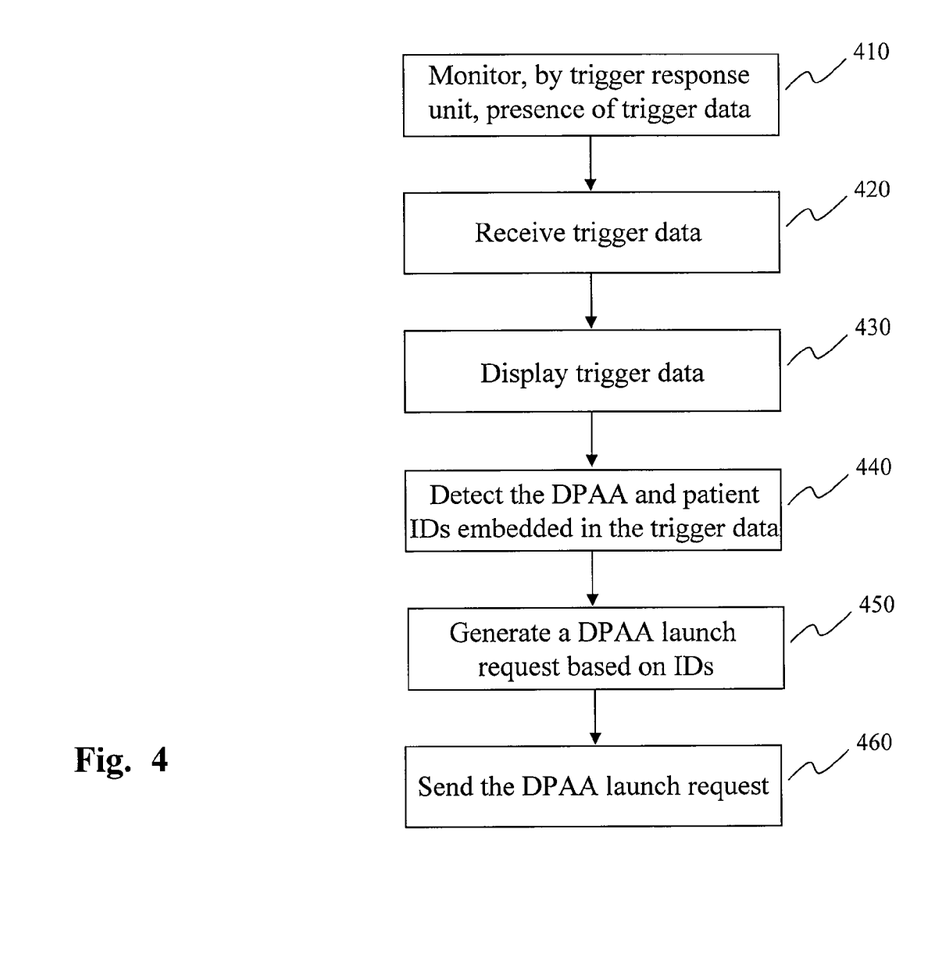
FIG. 4 is a flowchart of an exemplary partial process of a foreign system, according to an embodiment of the present teaching.

FIG. 4 is a flowchart of an exemplary partial process of the system 110, after the trigger response unit 144 is deployed in the foreign system environment 110, the trigger response unit 144 monitors, at 410, when trigger data created with respect to a DPAA system is present in the foreign system 110. When trigger data 130 are received at 420, the trigger data may be stored in a storage such as the database B 137 (see FIG. 1(*b*)) or a buffer (not shown in FIG. 1(*b*)). Such stored trigger data are accessible or can be activated for display upon a request from, e.g., a user. For instance, all trigger data may be listed on a user interface and a user may select a particular piece of trigger data by, e.g., clicking on a displayed representation of the desired trigger data. Once selected, the trigger data may be displayed, at 430, on a display screen of a workstation where the user is operating.

When the trigger data are displayed on a display screen, the trigger response unit 144, detects, the presence of the trigger data on the display screen. The trigger response unit 144 may then detect, at 440, the particular trigger pattern and extracts the identification information for both the underlying DPAA and the patient data embedded in the trigger data 130. In some embodiments, the detection of the trigger data may also be performed within a storage such as a memory where the trigger data resides. The memory may be of any form of storage medium known in the art. For instance, such a memory can be a video memory. The detection may also be performed in a temporary storage such as a buffer that stores the trigger data to be displayed. Such a buffer can be any form of temporary storage known in the art such as a register.

Based on the extracted DPAA identification information as well as the patient data identification information, the trigger response unit 144 sends such information to the remote application requesting unit 148, which generates, at 450, a request for launching a specific DPAA with specific patient data. The request for launching the DPAA is then sent to the system 105 where the DPAA resides.

Figure 5:
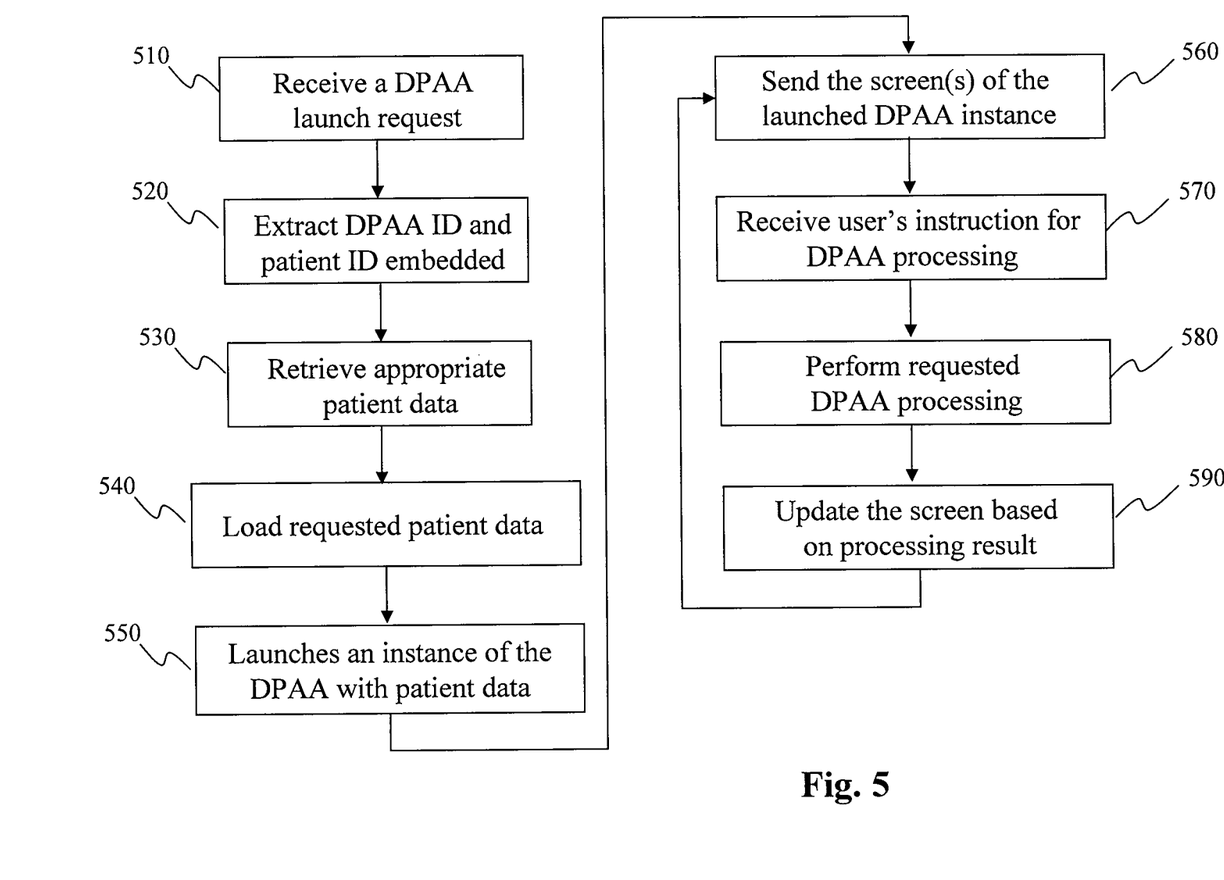
FIG. 5 is a flowchart of an exemplary partial process of a system hosting DPAAs, according to an embodiment of the present teaching.

FIG. 5 is a flowchart of an exemplary partial process of system 105, according to an embodiment of the present teaching. When the application manager 120 receives, at 510, a DPAA launch request, it extracts, at 520, the embedded DPAA identification information as well as the identification information of the desired patient data. Based on the extracted identification information, the application manager 120, retrieves, at 530, appropriate patient data, including both original data and processed results produced by the requested DPAA and loads, at 540, the retrieved patient data in order to launch an instance of the requested DPAA created appropriately with the patient data. The instance of DPAA is then launched, at 550, in system 105 and one or more screens of the launched DPAA instance are then sent, at 560, to the foreign system 110 via the remote access unit 154.

Figure 6:
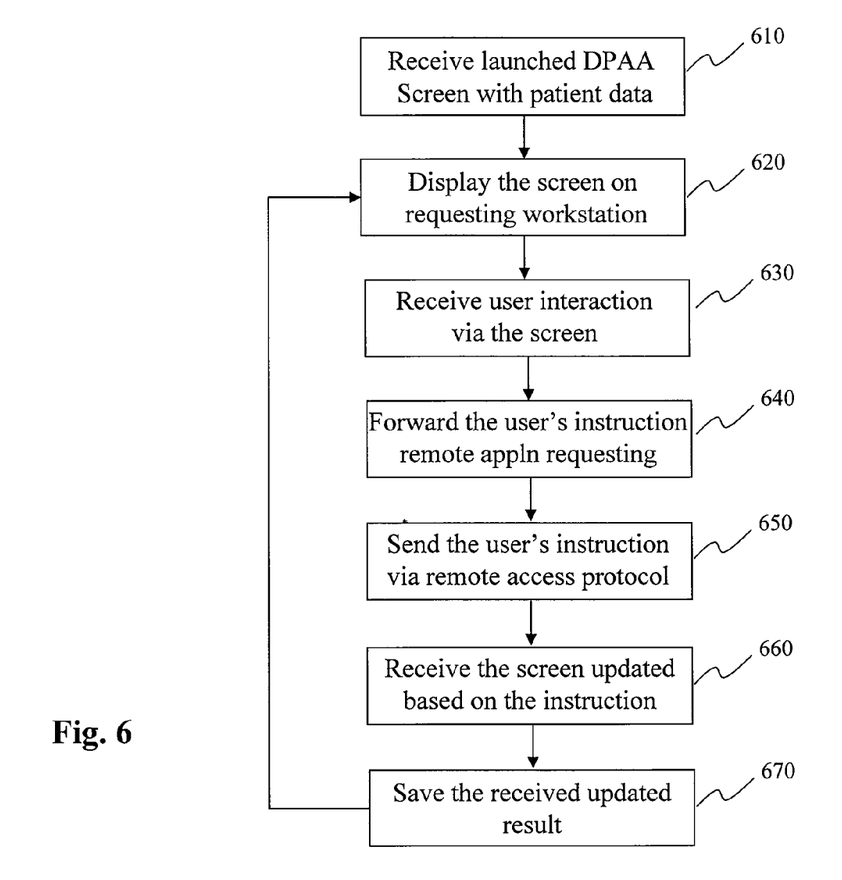
FIG. 6 is a flowchart of an exemplary process of a foreign system after it receives the screen of a launched DPAA, according to an embodiment of the present teaching.

FIG. 6 is a flowchart of an exemplary process of the foreign system 110 after it receives a screen of a launched DPAA instance, according to an embodiment of the present teaching. When the display unit 158 in the foreign system 110 receives, at 610, a launched DPAA screen with appropriately loaded patient data, the display unit 158 renders, at 620, the received screen on a display screen of the foreign system 110. This screen is realized as an alive screen, via remote access to the DPAA instance in the system 105, and allows a user in the foreign system 110 to interact with the launched DPAA instance in system 105 to perform different functions that the launched DPAA is capable of. A user may interact with the screen via any means offered by the launched DPAA such as clicking a button to invoke certain functions or creating a drawing to be superimposed on a patient data.

During the interaction between the user in the foreign system 110 and the launched DPAA instance, when the display unit 158 receives, at 630, information related to the user's operational request, the display unit 158 forwards, at 640, the user's request to the remote application requesting unit 148, which subsequently sends, at 650, the user's operational request to system 105 via the remote access protocol.

Referring back to FIG. 5, when the launched DPAA instance receives, at 570, the remote user's request for additional DPAA operation, the DPAA instance analyzes the additional request and performs, at 580, the requested operation. For instance, the remote user may have requested to launch a DPAA instance that is designed to detect liver nodules on a particular patient's CT scans and the launched instance is loaded with particular patient data. After viewing the nodule detection result in the foreign system 110, the remote user (e.g., a physician) may need to utilize the launched DPAA to edit the boundary of the detected nodules. To do so, the remote user may provide some correction boundary by interactively draw the correction on a display screen. To reflect that correction in the patient data, the original screen received from the system 105 needs to be updated. In this case, the user's selection of operation (hand drawn curve) and the operational data (the coordinates of the hand drawn points) are forwarded from the remote system 110 to the DPAA launched in system 105. When system 105 receives such information, the launched DPAA instance may then react, remotely, to the requested interaction from the remote user by updating the processing result.

Accordingly, after the requested processing is performed by the launched DPAA, it updates, at 590, the screen so that the result of the further processing is reflected in the updated screen. For instance, using the above example, the updated screen of the launched liver nodule detection DPAA includes the hand drawn boundary correction. Such an updated screen is then sent, at 560, to the foreign system 110. When the foreign system 110 receives, at 660 in FIG. 6, the updated screen, the remote user may save, at 670, the updated processing result of the patient data in the local system for subsequent access. In the meantime, the display unit 158 will display, at 620, the updated screen on a workstation where the remote user in operating to reflect the operational result due to the action performed by the remote user. This interactive process will continue (referring to both FIG. 5 and FIG. 6) until the remote user ends the operation with the launched DPAA.

Figure 7A:
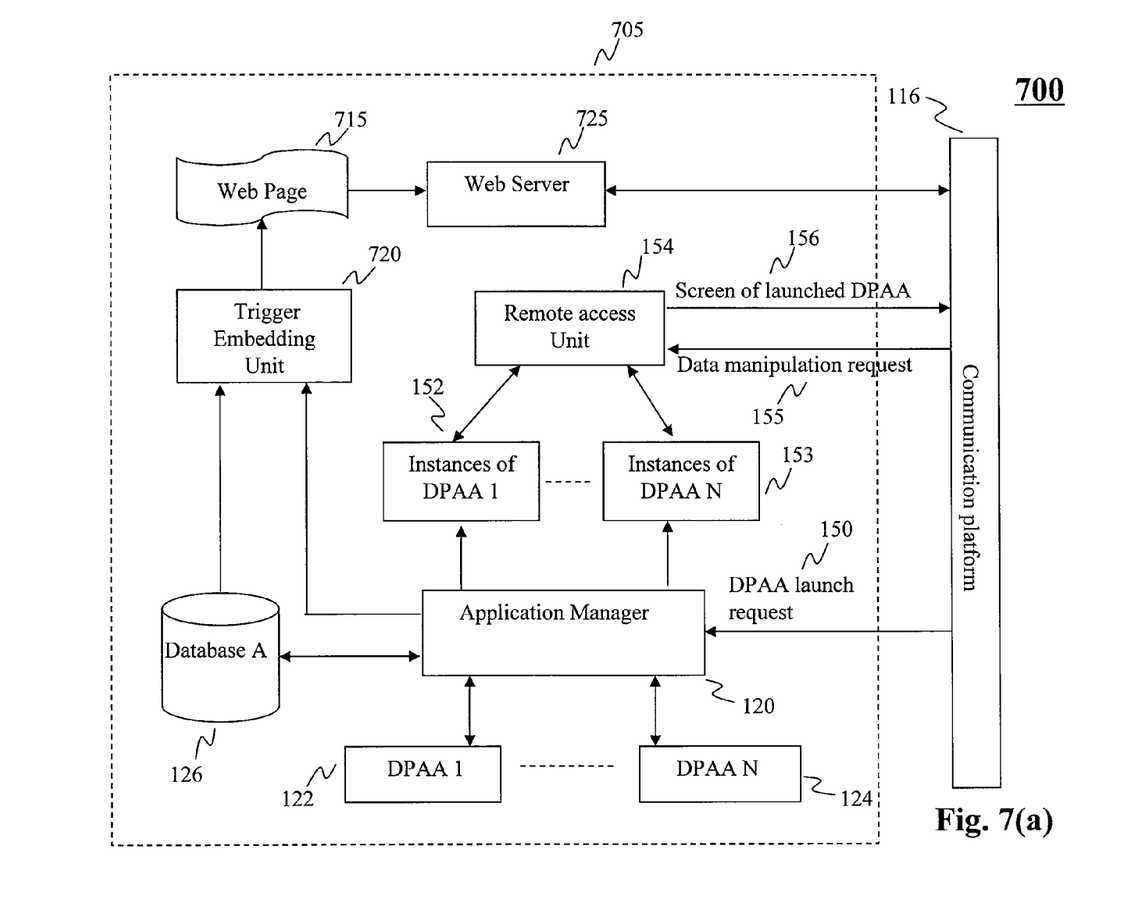
FIGS. 7(a) and 7(b) depict another exemplary construct of a system configured for accessing an application residing on one system from a different system, according to an embodiment of the present teaching.
Figure 7B:
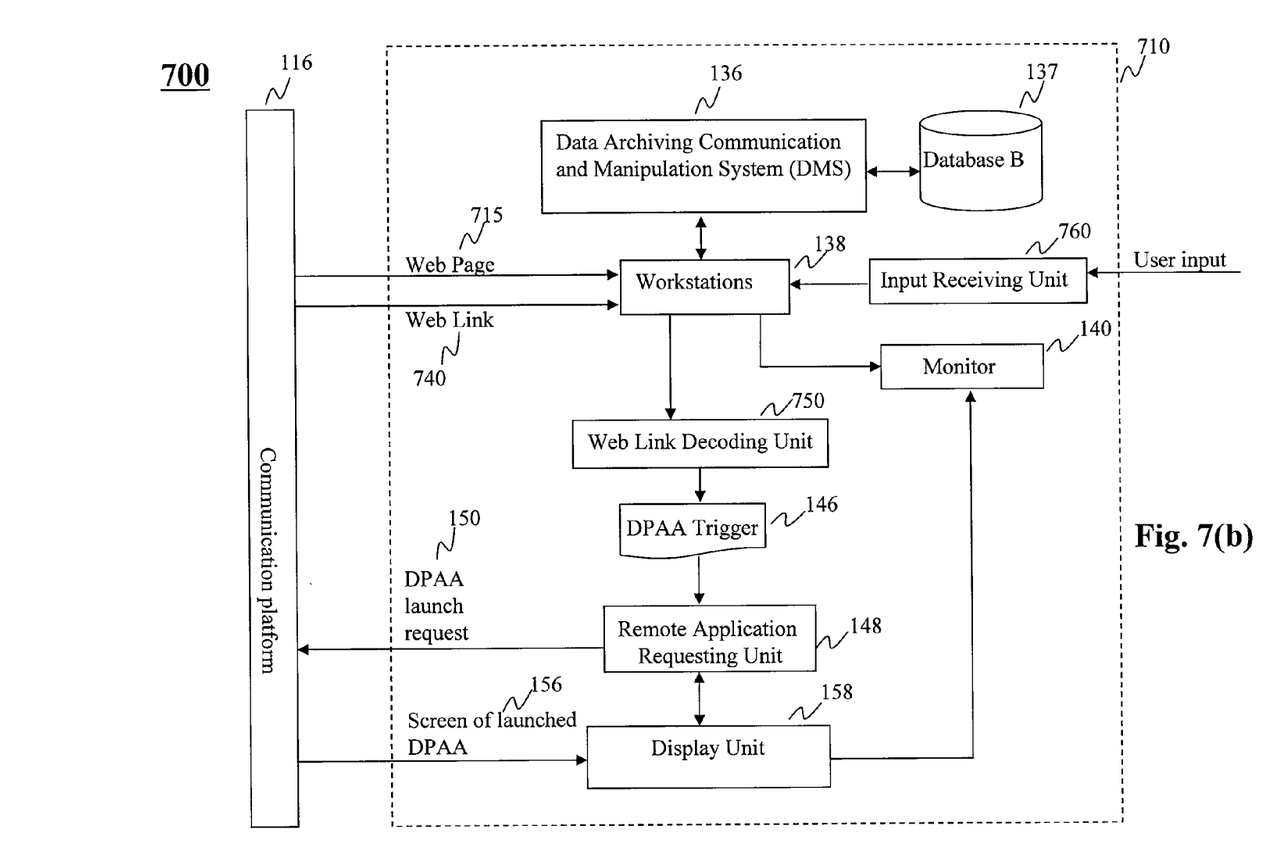

FIGS. 7(a) and 7(b) depict another exemplary construct of a system configured for accessing an application residing on one system from a different system, according to an embodiment of the present teaching. In this embodiment, a DPAA residing in a system 705 (shown in FIG. 7(a)) is accessed from a foreign system 710 (shown in FIG. 7(b)) by activating a trigger embedded in a web page. The system 705 where one or more DPAA and patient data reside comprises similar components as in system 105 (FIG. 1(a)) such as a plurality of DPAAs 122, . . . , 124 and their corresponding instances 152, . . . , 153, the application manager 150, the remote access unit 154, and database A 126 storing patient data and processing results thereof. To achieve web page based triggering of remote access of DPAAs, the system 705 also comprises a trigger embedding unit 720, a web page 715, and a web server 725.

Specifically, after patient data stored in the database A are processed by a DPAA, the processing results are also stored in database A 126 with embedded identification information specifying the underlying DPAA used for the processing. Such patient data together with their processing results having DPAA identification information embedded therein can be retrieved by the trigger embedding unit 720 to implement a web page driven triggering system. In the illustrated embodiment, the identification information is to be coded or embedded in web page 715.

The web page 715 may be used to list one or more pieces of patient data and their corresponding processing results embedded with identification information of the DPAAs that can be used to review the processing results and further process the corresponding patient data. Each piece of patient data may be listed on web page 715 in a manner that is selectable and individually accessible. For example, it may be represented as a web link in the form of a Universal Resource Locator (URL). In such a representation, unique identification information for data associated therewith and for an underlying DPAA used to process the data may be encoded therein.

As illustrated, the web page 715 is hosted by web server 725, which may reside within system 705. The web server 725 may also be located outside of the system 705 (not shown) such as a third party system. When the web server is within the system 705, the web page 715 can be accessed via the communication platform 116. Because the representation of each piece of patient data (e.g., web link) is selectable and individually identifiable, each piece of patient data can be selected via the web page 725. In addition, as each piece of patient data encapsulate the identification information of the underlying DPAA used to process the data, such DPAA can also be selected.

Information presented in web page 715 may be made accessible via a network connection made through the communication platform 116. Due to the variety forms of network connections that the communication platform 116 may take, the web page 715 can be accessed in many different ways such as via the public Internet connection, a proprietary network connection, a LAN connection, a WAN connection, a wired network connection, a wireless network connection, or any combination thereof.

On web page 715, patient data and their processing results may be presented in certain forms to facilitate remote access. For example, when information associated with each patient, including original patient data as well as processing results, is presented as a web link, the link can be clicked to activate the a remote access. The activation may also take different forms. For instance, upon being clicked, the web server 725 may send out an URL corresponding to the clicked link. Alternatively, upon being clicked, the web server 725 may also receive a cookie representing a network location where the party who made the click resides. The web server may then send, via a private channel, information that can be used to access the selected patient data to the party at the network location.

System 710, as illustrated in FIG. 7(*b*), comprises also components similar to system 110. To enable access remotely DPAAs and patient data residing in system 705 via web page based triggering, system 710 also includes an input receiving unit 760 and a web link decoding unit 750. In operation, the patient data and their processing results enlisted on web page 715 (with each entry being selectable and uniquely identifiable) can be accessed by a user in the foreign system 710 at a workstation 138. Upon reviewing the web page, the user may select a particular piece of patient data for remote access. The user's selection is received by the input receiving unit 760 and a web link 740, corresponding to the selected patient data, is received by the workstation 138. Alternatively, information (e.g., a data access handle) enabling the user to access the selected patient data may also be sent to the user at workstation 138 via a different channel (now shown).

The information corresponding to the selected patient data (web link or else) may be forwarded to the trigger decoding unit 750, which may then extract the identification information for both the patient data and the DPAA used to process the patient data for remotely access the patient data and the underlying DPAA. A DPAA trigger 146 is formed, which can be used to generate a DPAA launching request 150. The remaining operation in terms of accessing DPAA and further processing the patient data by using a remotely instantiated DPAA is the same as what is discussed herein.

While the inventions have been described with reference to the certain illustrated embodiments, the words that have been used herein are words of description, rather than words of limitation. Changes may be made, within the purview of the appended claims, without departing from the scope and spirit of the invention in its aspects. Although the inventions have been described herein with reference to particular structures, acts, and materials, the invention is not to be limited to the particulars disclosed, but rather can be embodied in a wide variety of forms, some of which may be quite different from those of the disclosed embodiments, and extends to all equivalent structures, acts, and, materials, such as are within the scope of the appended claims.

We claim:

1. A method implemented on at least one computer system each of which has at least one processor, storage, and a communication platform for process/data sharing, comprising the steps of:

deploying a trigger response unit, corresponding to a first application residing in a first computer system, in a second computer system;

detecting, by the trigger response unit, information embedded in trigger data that represents the first application with associated data when a graphical representation corresponding to the trigger data is displayed in the second computer system;

sending a launching request, generated based on the information detected, to the first computer system to launch an instance of the first application in the first computer system with respect to the associated data;

receiving, by the second computer system via a remote access protocol, a dynamic graphical representation of the first application that is launched in the first computer system based on the launching request; and manipulating, in the second computer system, the associated data using the launched first application via the dynamic graphical representation of the first application displayed in the second computer system, wherein the step of manipulating comprises:

facilitating an interaction between a user of the second computer system and the dynamic graphical representation displayed in the second computer system;

sending, via the remote access protocol, a data manipulation request constructed based on information related to the interaction to the first computer system to request the launched first application to manipulate the associated data;

receiving, via the remote access protocol, an updated graphical representation of the launched first application from the first computer system; and displaying the updated graphical representation of the first application, wherein the updated graphical representation incorporates the result of the requested manipulation of the associated data.

2. The method according to claim 1, wherein the trigger response unit is deployed by installing the trigger response unit on the second computer system.

3. The method according to claim 1, wherein the trigger response unit is deployed by downloading the trigger response unit from the first computer system to the second computer system.

4. The method according to claim 1, wherein the information embedded in the trigger data is used to identify the first application and the associated data residing in the first computer system.

5. The method according to claim 1, wherein the step of detecting comprises:

monitoring when the trigger data are displayed on a display device in the second computer system;

identifying a trigger pattern of the trigger data; and extracting the information related to the first application and the associated data from the trigger data.

6. The method according to claim 1, wherein the associated data include patient data.

7. The method according to claim 1, wherein the instance of the first application corresponds to the first application that is loaded with the associated data.

8. The method according to claim 1, wherein the remote access protocol includes one of a remote frame buffer, a remote desktop protocol (RDP), an X display protocol, and an Hypertext Transfer Protocol (HTTP).

9. The method according to claim 1, wherein the dynamic graphical representation of the first application launched in the first computer system is a screen of a graphical user interface (GUI) of the first application.

10. A method implemented on at least one computer system each of which has at least one processor, storage, and a communication platform for process/data sharing, comprising the steps of:

constructing a trigger response unit, corresponding to a first application residing in a first computer system;

sending trigger data, generated with respect to the first application with associated data, to a second computer system;

receiving, from the second computer system, a launching request to launch an instance of the first application in the first computer system with respect to the associated data when a graphical representation corresponding to the trigger data is displayed in the second computer system;

launching an instance of the first application with the associated data based on the launching request;

sending, from the first computer system to the second computer system via a remote access protocol, a dynamic graphical representation of the launched first application, wherein the launching request is embedded with a representation of the first application and a representation of the associated data;

receiving, via the remote access protocol, a data manipulation request, constructed based on an interaction occurred in the second computer system between a user and the graphical representation of the first computer system, to request the launched first application in the first computer system to manipulate the associated data;

manipulating, by the launched first application, the associated data based on the data manipulation request to generate a manipulation result; and sending, via the remote access protocol, updated information related to the launched first computer system to the second computer system, wherein the updated information incorporates the manipulation result.

11. The method according to claim 10, wherein the dynamic graphical representation of the first application is a screen of a graphical user interface (GUI) of the launched first application system.

12. The method according to claim 10, wherein the associated data include patient data.

13. The method according to claim 10, wherein the instance of the first application corresponds to the first application that is loaded with the associated data.

14. The method according to claim 10, wherein the remote access protocol includes one of a remote frame buffer, a remote desktop protocol (RDP), an X display protocol, and an Hypertext Transfer Protocol (HTTP).

15. The method according to claim 10, wherein the step of sending a dynamic graphical representation of the launched first application comprises:

generating an updated GUI representation of the launched first application based on the manipulation result; and sending, via the remote access protocol, the updated GUI representation of the launched first application from the first computer system to the second computer system.

16. A system for process/data sharing, comprising:

a trigger response unit, corresponding to a first application residing in a first computer system having a first processor, storage, and communication platform, and deployed in a second computer system having a second processor, storage, and communication platform, the trigger response unit being configured for:

monitoring, in a second computer system, when a graphical representation corresponding to the trigger data associated with the first application is displayed in the second computer system, and detecting information embedded in the trigger data that represents the first application with associated data;

a remote application requesting unit configured for sending a launching request, generated based on the information detected by the trigger response unit, to the first computer system to launch an instance of the first application in the first computer system with respect to the associated data; and a display unit configured for:

receiving, via a remote access protocol, a dynamic graphical representation of the launched first application, displaying the received dynamic graphical representation of the launched first application on a display device in the second computer system, facilitating a user in the second computer system to manipulate the associated data using the launched first application via the graphical representation of the first application, enabling an interaction between a user of the second computer system and the dynamic graphical representation displayed in the second computer system, sending a data manipulation request, constructed based on the interaction, to the first computer system to request the first application in the first computer system to manipulate the associated data, receiving, via a remote access protocol, an updated graphical representation of the launched first application from the first computer system, and displaying the updated graphical representation of the first application, wherein the updated graphical representation incorporates the result of the requested manipulation of the associated data.

17. A system for process/data sharing, comprising:

a first application, residing in a first computer system having a first processor, storage, and communication platform, configured for processing data;

a trigger data generation unit configured for generating trigger data corresponding to the first application with associated data;

a communication unit configured for sending the trigger data to a second computer system having a second processor, storage, and communication platform;

an application manager configured for:

receiving, from the second computer system, a launching request to launch an instance of the first application in the first computer system with respect to the associated data when a graphical representation corresponding to the trigger data is displayed in the second computer system, and launching an instance of the first application with the associated data based on the launching request; and a remote access unit configured for:

sending, from the first computer system to the second computer system via a remote access protocol, a dynamic graphical representation of the launched first application, wherein the launching request is embedded with a representation of the first application and a representation of the associated data, receiving, via the remote access protocol, a data manipulation request, generated based on an interaction occurred in the second computer system between a user and the dynamic graphical representation of the launched first computer system, to request the launched first application to manipulate the associated data, and forwarding the data manipulation request to the launched first application, wherein the launched first application is configured for:

manipulating the associated data based on the data manipulation request to generate a data manipulation result, generating updated information reflecting the data manipulation result, and sending the updated information to the remote access unit, the updated information including an updated graphical representation of the launched first application which incorporates the data manipulation result.

18. The system according to claim 17, wherein the remote access unit is further configured for:

receiving the updated information from the launched first application; and sending, via the remote access protocol, the updated information to the second computer system.

19. A method implemented on at least one computer system each of which has at least one processor, storage, and a communication platform for process/data sharing, comprising the steps of:
- accessing, in a second computer system, a network-accessible representation that corresponds to a first application residing in a first computer system;
- detecting, information embedded in the network-accessible representation and corresponding to data encapsulated with the first application when the network-accessible representation is displayed in the second computer system;
- sending a launching request, generated based on the information detected, to the first computer system to launch an instance of the first application in the first system with respect to the data;
- receiving, by the second computer system via a remote access protocol, a dynamic graphical representation of the first application that is launched in the first computer system based on the launching request; and
- manipulating, in the second computer system, the data using the launched first application via the dynamic graphical representation of the first application displayed in the second computer system, wherein the step of manipulating comprises:
- facilitating an intern on between a user of the second computer system and the dynamic graphical representation displayed in the second computer system;
- sending, via the remote access protocol, a data manipulation request constructed based on information related to the interaction to the first computer system to request the launched first application to manipulate the data;
- receiving, via the remote access protocol, an updated graphical representation of the launched first application from the first computer system; and
- displaying the updated graphical representation of the first application, wherein the updated graphical representation incorporates the result of the requested manipulation of the data.

20. A method implemented on at least one computer system each of which has at least one processor, storage, and a communication platform for process/data sharing, comprising the steps of:
- generating a network-accessible representation of data encapsulated with a first application residing in a first computer system, where the network-accessible representation embeds identification information of the data and the first application;
- receiving, from a second computer system, a launching request to launch an instance of the first application in the first computer system with respect to the data when the network-accessible representation is displayed in the second computer system;
- launching an instance of the first application loaded with the data based on the launching request;
- sending, from the first computer system to the second computer system via a remote access protocol, a dynamic graphical representation of the launched first application, wherein the launching request is constructed based on the identification information of the data and the first application embedded in the network accessible representation;
- receiving, via the remote access protocol, a data manipulation request, constructed based on an interaction occurred in the second computer system between a user and the dynamic graphical representation of the first computer system, to request the launched first application in the first computer system to manipulate the data;
- manipulating, by the launched first application, the data based on the data manipulation request to generate a manipulation result; and
- sending, via the remote access protocol, updated information related to the launched first computer system to the second computer system, wherein the updated information incorporates the manipulation result.

21. The method according to claim 19 or 20, wherein the network-accessible representation is a web link included in a web page.

* * * * *